United States Patent [19]

Silverwater

[11] Patent Number: 4,783,271
[45] Date of Patent: Nov. 8, 1988

[54] TEMPERATURE RESPONSIVE BYPASS FILTER ASSEMBLY

[75] Inventor: Bernard F. Silverwater, Plainview, N.Y.

[73] Assignee: Pall Corporation, Glen Cove, N.Y.

[21] Appl. No.: 879,308

[22] Filed: Jun. 27, 1986

[51] Int. Cl.⁴ .......................................... B01D 27/10
[52] U.S. Cl. ..................... 210/742; 210/149; 210/168; 210/315; 210/DIG. 13
[58] Field of Search ............... 210/149, 168, 256, 315, 210/416.5, 428–432, 440, 742, 443, 446, DIG. 13, DIG. 17; 55/20, 217

[56] References Cited

U.S. PATENT DOCUMENTS

| | | | |
|---|---|---|---|
| 2,529,698 | 11/1950 | Julius | 210/183 |
| 2,672,984 | 3/1954 | Russell | 210/131 |
| 2,729,339 | 1/1956 | McCoy | 210/149 |
| 3,262,564 | 7/1966 | Pall et al. | 210/DIG. 13 |
| 3,262,565 | 7/1966 | Silverwater | 210/DIG. 13 |
| 3,269,541 | 8/1966 | Neely | 210/132 |
| 3,283,902 | 11/1966 | Farris et al. | 210/DIG. 13 |
| 4,033,870 | 7/1977 | Parquet et al. | 210/90 |
| 4,038,189 | 7/1977 | Dison et al. | 210/90 |
| 4,181,611 | 1/1980 | Rubenstein et al. | 210/149 |
| 4,388,196 | 6/1983 | Lucia | 210/742 |
| 4,406,784 | 9/1983 | Cochran | 210/168 |

FOREIGN PATENT DOCUMENTS 3422979  1/1986  Fed. Rep. of Germany ...... 210/149
574614  1/1946  United Kingdom .

Primary Examiner—Barry S. Richman
Assistant Examiner—Richard D. Jordan
Attorney, Agent, or Firm—Leydig, Voit & Mayer

[57] ABSTRACT

A filter assembly for removing particles from a fluid which comprises first and second filters, each having a porous filter medium. The mean pore diameter of the porous filter medium of the second filter is greater than the mean pore diameter of the porous filter medium of the first filter. The filter assembly further comprises structure for directing the fluid serially through the first filter and then through the second filter, a mechanism for sensing the temperature of the fluid, and a valve arranged in parallel with the first filter and serially with the second filter. The valve is coupled to the temperature-sensing mechanism so that at least a portion of the fluid is directed around the first filter in response to a predetermined fluid temperature. For example, in the illustrated embodiment, the fluid is directed around the first filter when the fluid temperature is below a predetermined value.

15 Claims, 1 Drawing Sheet

TEMPERATURE RESPONSIVE BYPASS FILTER ASSEMBLY

Technical Field

The present invention relates to filter assemblies for fluid systems and, in particular, to filter assemblies for such fluid systems as hydraulic systems or lubrication systems.

Background Art

Engine oil lubrication systems, which are typical of many fluid systems, frequently include a filter assembly which has a filter formed from a porous filter medium for removing damaging particles from the lubricating oil utilized in the system. Mechanical wear within the engine, the outside environment, and contaminants accidentally introduced during normal servicing provide a source of large particles which may plug lubricating nozzles or severely damage parts and create excessive wear on any surfaces relying on a thin film of the lubricating oil for protection.

These systems typically rely upon a pump to force the oil through the filter and then circulate the filtered oil to the moving parts of the engine for lubrication. Oil is forced through the filter by limited pressure developed on the upstream side of the filter by the oil pump. The pressure required to force oil to pass through the filter at a given rate will be greater for more viscous or thick oils or for filters formed from finer pored filter media, i.e., porous filter media having smaller average or mean pore diameters.

Oil is generally thicker or more viscous at low temperatures and thus, when an engine is started and the engine parts and oil are cold, a larger pressure is required to force the oil through the filter than after the engine has reached operating temperature. Since the pump frequently has limited pressure capabilities, many systems include a bypass valve which will open when the pressure exceeds a predetermined value and allow oil to bypass the filter. This results in unfiltered oil being pumped through the engine where the large particles may harm the moving parts and clog passages. Further, the high upstream pressure developed during a cold start may cause the lighting of a high pressure oil light, erroneously indicating that the filter is dirty or the lubrication system is otherwise obstructed.

DISCLOSURE OF THE INVENTION

A general object of the present invention is to provide an improved filter assembly for a fluid system. A more specific object is to assure that filtration is provided for all oil that is pumped through the fluid system regardless of the temperature of the fluid.

Accordingly, the present invention provides a filter assembly which removes particles from a fluid and which comprises two filters and a structure for directing the fluid first through one filter and then through the other. Each filter includes a porous filter medium. However, the filter medium of the downstream filter is coarser than the filter medium of the upstream filter, i.e., the mean pore diameter of the porous filter medium of the downstream filter is greater than the mean pore diameter of the porous filter medium of the upstream filter. The filter assembly further comprises a mechanism for sensing the temperature of the fluid and a valve which is responsive to the temperature-sensing mechanism. The valve is arranged in parallel with the upstream filter so that, when the fluid temperature reaches a predetermined value as sensed by the sensing mechanism, the valve opens, allowing the fluid to bypass the upstream filter and flow through the coarser downstream filter. For example, in one embodiment of the invention, the valve is open when the fluid temperature is below the predetermined value.

With the filter assembly according to the invention, the fluid is always filtered, regardless of the temperature of the fluid. When the fluid temperature increases, e.g., approaches the normal operating temperature, and reaches a predetermined value, as sensed by the sensing mechanism, the valve closes, causing all the fluid to flow through both filters. Thus, the finer upstream filter removes all particles from the fluid while the coarser downstream filter serves as a backup filter in case the upstream filter is damaged or defective. However, when the temperature of the fluid, as sensed by the sensing mechanism, falls below the predetermined value, e.g., falls below a predetermined lower limit when the engine is shut down, the valve opens. Consequently, when the engine is next started, the fluid partially bypasses the upstream filter but all of the fluid is passed through the coarser downstream filter. The downstream filter may frequently be physically smaller than the upstream filter. Therefore, in order to minimize the obstruction to flow by the downstream filter when filtering cold, viscous oil, the downstream filter preferably has a much larger mean pore diameter than the upstream filter. However, the mean pore diameter of the downstream filter is nonetheless designed small enough that the filtration provided by the downstream filter is sufficient to remove any large particles which may have been introduced into the fluid.

Other objects, advantages, and aspects of the invention will become apparent upon reading the following detailed description and appended claims and upon reference to the accompanying drawings.

BEST MODE FOR CARRYING OUT THE INVENTION

Figure 1:
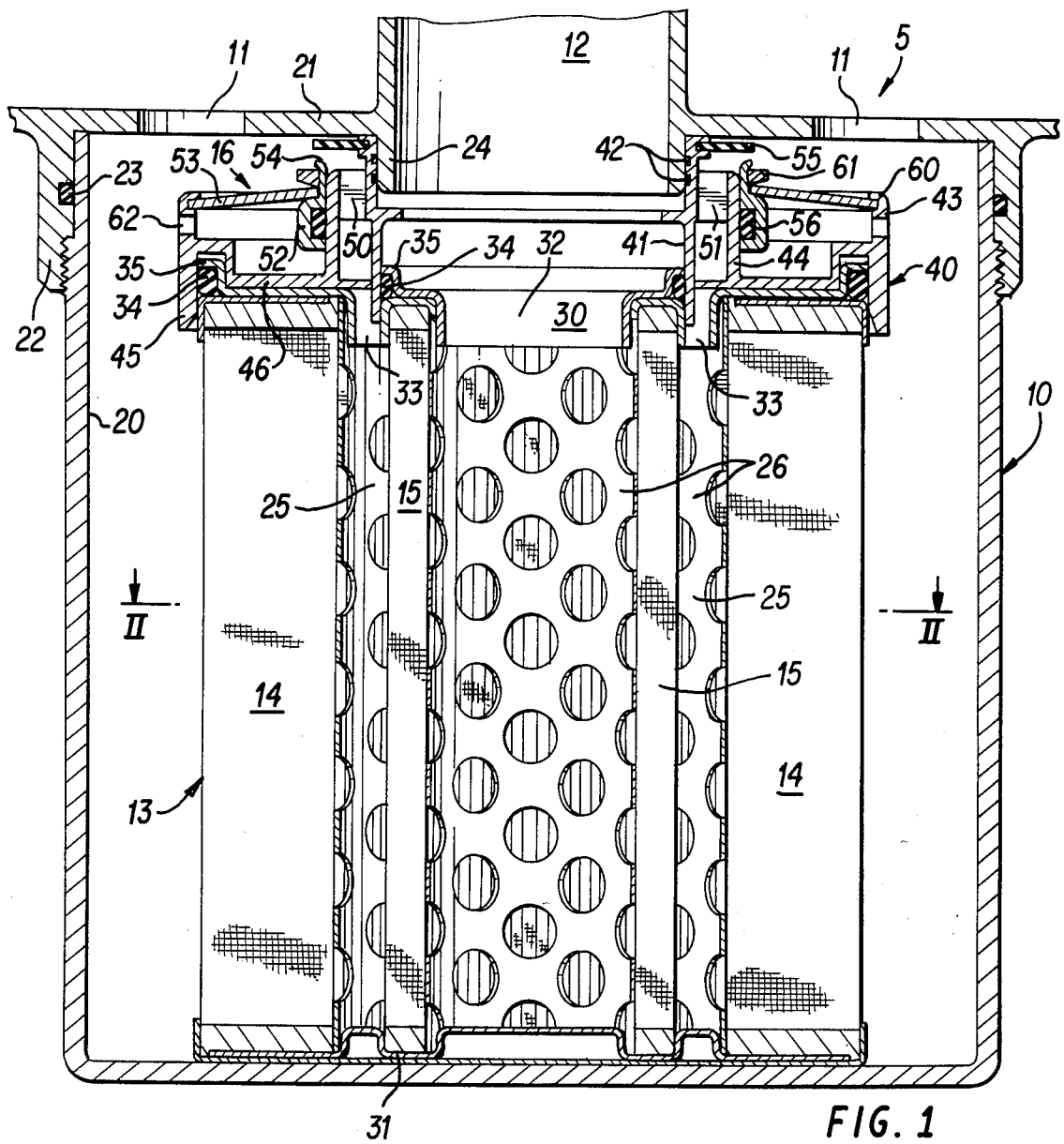
FIG. 1 is a sectional view of the exemplary filter assembly embodying the invention taken through the axis of the filter assembly.

As illustrated in FIG. 1, an exemplary filter assembly 5 embodying the present invention generally comprises a housing 10 defining a fluid flow path between inlet ports 11 and an exhaust port 12, a filter element 13 having a primary filter 14 and a coarser secondary filter 15, and a temperature-responsive valve 16 arranged in parallel with the primary filter 14. In the exemplary filter assembly 5, during normal operating temperatures, the temperature-responsive valve 16 is closed and the fluid flows through the inlet ports 11, serially through the primary and then the secondary filters 14, 15, and through the exhaust port 12. However, at temperatures below a predetermined temperature, e.g., a predetermined upper limit, the temperature-responsive valve 16 remains open and at least a portion of the fluid bypasses the finer primary filter 14, decreasing the differential pressure across the filter element 13. Alternatively, a filter assembly according to the present invention may be arranged so the temperature-responsive valve is open during normal operating temperatures and is closed when the fluid temperature is below a predetermined value.

Although the housing of the filter assembly may be variously configured, the housing 10 of the exemplary filter assembly 5 comprises a cylindrical canister 20 and a top plate 21. The cylindrical canister 20 and top plate 21 may be fashioned from any suitably rigid, impervious material compatible with the fluid and one another, including, for example, aluminum sheet and cast aluminum, respectively. In the exemplary filter assembly 5, the canister 20 and top plate 21 are removably joined by means of an internally-threaded flange 22 on the top plate 21 which accepts external threads on the canister 20. An O-ring 23 lying in a groove in the flange 22 provides a seal against fluid leakage. The top plate 21 includes the inlet ports 11 through which fluid enters the housing 10 at high pressure and the exhaust port 12 which is formed with an exhaust flange 24. The canister 20, when removably joined with the top plate 21, serves to retain the filter element 13 in cooperative relation to the top plate 21 by urging it against the top plate 21. In one contemplated application, the element equivalent to top plate 21 might comprise the filter pad of an aircraft engine, and the element equivalent to the canister 20 might comprise the filter bowl or can.

The filter element, which comprises both the primary and secondary filters, may be configured in a variety of ways without departing from the scope of the invention. However, in the exemplary filter assembly 5, primary filter 14 and secondary filter 15 preferably have a hollow cylindrical configuration with the inner diameter of the primary filter 14 being larger than the outer diameter of the secondary filter 15. The primary and secondary filters 14, 15 are mounted in coaxial relation so as to define an annular space 25 between them.

Any of several suitably porous filter media may be utilized in fashioning either the primary or secondary filter including, for example, a woven or nonwoven fibrous material, porous membrane, wire mesh, or porous sintered material. For instance, the filter medium of the primary filter 14 of the exemplary filter assembly 5 may preferably comprise resin-impregnated organic and inorganic fibers available from Pall Corporation under the trademark ULTIPOR, while the filter medium of the secondary filter 15 may preferably comprise a square-mesh weave metal cloth.

Figure 2:
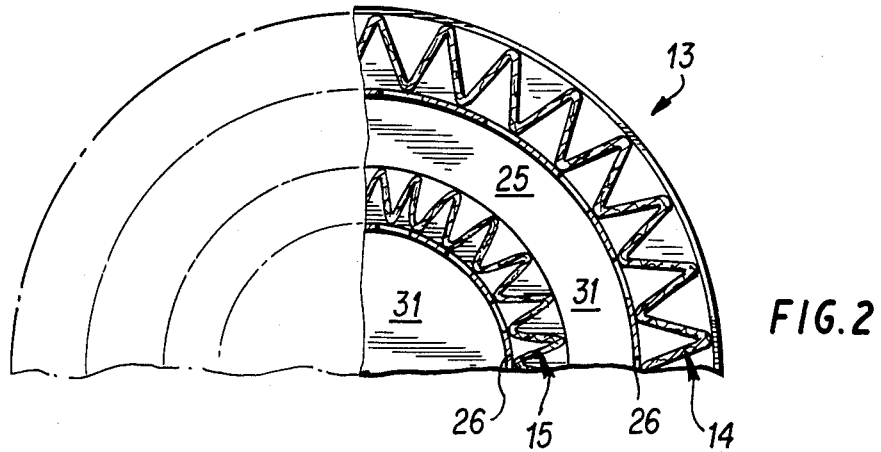
FIG. 2 is a partial section view of the exemplary filter assembly taken at the line II—II of FIG. 1.

Further, the filter medium of either the primary or secondary filter 14, 15 may be fabricated by a process which yields a pleated sheet configuration, as shown in FIG. 2, to provide increased surface area and enhanced structural rigidity and effectiveness at high differential pressures. The filter medium may also be laminated between upstream and downstream support and drainage layers to reduce pressure drop and further enhance strength and durability.

However, in accordance with another aspect of the invention, the filter media of the secondary filter 15 has a mean pore diameter greater than that of the filter medium of the primary filter 14, that is, the mean or average equivalent diameter of the pores or flow channels through the filter medium of the secondary filter 15 are larger than those of the primary filter 14. The ratio of the mean pore diameter of the filter medium of the secondary filter 15 to that of the primary filter 14 may vary depending on the application of the filter assembly. A ratio in the range of about 3 to about 100 may be preferable. For example, in one contemplated application, the ratio is approximately 1:100, the mean pore diameter of the primary filter 14 being 1 micrometer while that of the secondary filter 15 is 100 micrometers.

Both the primary filter 14 and secondary filter 15 are preferably provided with internal support cores 26 on the internal, downstream, low pressure side of the filter medium to prevent collapse of the filter medium due to high differential pressures. The internal support cores 26 are preferably sufficiently perforated so as not to unduly interfere with fluid flow and may be made of metal, plastic, or any other suitably rigid material to support the filter medium and that is compatible with the fluid being filtered. As an example, the internal support cores 26 may be formed of a molded plastic or perforated metal material. Filter cages may also be provided on the upstream side of the primary filter 14 and secondary filter 15 to support the filter media in the case of an accidental back flow.

The filter element 13 further includes upper and lower impervious end plates 30, 31 which serve to maintain the primary and secondary filters 14, 15 in coaxial position and to direct the fluid through the filters 14, 15. In the exemplary filter assembly 5, the lower end plate 31, which rests against the canister 20, has no openings and provides a barrier to fluid flow through the lower end of the filter element 13. The upper end plate 30 includes a central aperture 32 which communicates between the exhaust port 12 and the interior of the secondary filter 15 and several additional apertures 33 which are defined by spokes (not shown) and form a generally annular opening communicating with the space 25 between the primary and secondary filters 14, 15.

To prevent the fluid from bypassing the filter media, the filter media are preferably bonded to the end plates 30, 31 by the use of an epoxy potting material. Alternatively, depending on the material used for the filter media and the end plates 30, 31, they may be attached to one another by spin bonding, heat-melt sealing, or any other suitable process. To prevent the fluid from bypassing the primary or secondary filter 14, 15, O-rings 34 are fitted to annular caps 35 which in turn are attached to the upper end plate 30. The O-rings 34 are urged against the housing 10 when the canister 20 is threaded onto the top plate 21, creating seals to prevent fluid from flowing around the annular ends of both the primary filter 14 and the secondary filter 15. Alternatively, the filter element 13 may be sealed against the housing 10 in any suitable manner to prevent the fluid from bypassing the primary and secondary filters 14, 15.

In the exemplary filter assembly 5, the primary and secondary filters 14, 15 are joined as one removable unit by the upper and lower end plates 30, 31. Alternatively, they may be made separately removable for replacement or cleaning, for example, by potting the lower end of the primary and secondary filters 14, 15 to annular caps and seals similar to those on the upper end plate 30. The primary and secondary filters 14, 15 would then be held in position by the lower end plate 31 when the canister 13 is in place.

An annular adapter 40 has a central sleeve 41 which slips over the exhaust flange 24 while an O-ring and groove arrangement 42 seals the central sleeve 41 against the exhaust flange 24. In the exemplary filter assembly 5, the annular adapter 40, in addition to the filter element 13, is urged into position when the canister 20 is threaded onto the top plate 21. Alternatively, the joint between the central sleeve 41 and exhaust flange 24 may be sealed by an epoxy resin and groove arrangement, or the annular adapter 40 may be integrally formed with the top plate 21. A lower portion of the central sleeve 41 engages the upper end plate 30 of the filter element 13 near the upper end of the secondary filter 15, the O-ring 34 sealing against the central sleeve 41. An outer toroidal portion 43 of the adapter 40 includes inner and outer walls 44, 45 and a base 46 and is supported around the central sleeve 41 by support webs 50. The support webs 50 join the central sleeve 41 to the inner wall 44 so as to form an annular port 51 between the central sleeve 41 and the inner wall 44 of the toroidal portion 43. The base 46 of the toroidal portion 43 of the annular adapter 40 is contoured to engage the upper end plate 30 near the upper end of the primary filter 14, the O-ring 34 sealing against the outer wall 45 of the toroidal portion 43.

The temperature-responsive valve 16 may be variously configured without departing from the scope of the invention. However, in the exemplary filter assembly 5, the temperature-responsive valve 16 generally comprises a valve gate 52 mechanically coupled to a Belleville spring washer 53 formed from a bimetal or shape memory metal or any other device which moves between a first shape at one temperature and a second shape at another temperature.

The valve gate 52 is generally annular and includes a circular sealing edge 54. Surrounding the inner wall 44 of the toroidal portion 43 of the annular adapter 40, the valve gate may slide upward along the inner wall 44 to bring its sealing edge 54 into contact with a seat ring 55 which lies in a plane normal to the axis of the central sleeve 41 and is retained in a groove about the central sleeve 41. With the valve gate 52 seated against the seat ring 55, the annular port 51 is isolated from the high pressure fluid in housing 10, an O-ring 56 sealing the valve gate 52 against the inner wall 44. The seat ring 55 may be made of any sufficiently compliant yet resilient or rigid seat material, including, for example, stainless steel.

The outer wall 45 of the toroidal portion 43 of the annular adapter 40 is grooved on its inner edge to receive the outer edge of the bimetal or shape memory metal Belleville spring washer 53. The inner edge of the bimetal washer 53 is sized to closely surround the annular valve gate 52 and is locked to the valve gate 52 between a shoulder 60 formed on the valve gate 52 and a locking ring 61. The bimetal washer 53 is formed with a higher coefficient of thermal expansion at its lower surface so that, at higher temperatures, the washer 53 warps upward toward its inner edge and operates against the locking ring 61 to hold the annular valve gate 52 against the seat ring 55, thereby isolating annular port 51. Relief holes 62 are drilled in the outer wall 45 of the toroidal portion 43 to equalize pressure on opposing surfaces of the washer 53 to assure that the position of the annular valve gate 52 is determined only by temperature.

In the preferred mode of operation, fluid is forced into the housing 10 through the inlet ports 11, for example, by a pump (not shown). During normal operating temperatures, the temperature-responsive valve is closed, the bimetal washer 53 maintaining the valve gate 52 seated against the seat ring 55. Consequently, once the fluid enters the housing 10 through the inlet ports 11, it flows radially inward through the primary and secondary filters 14, 15 and then flows axially through the interior of the secondary filter 15, through the central aperture 32 in the upper end plate 30, and through the exhaust port 12. Although the fluid flows serially through the primary and secondary filters 14, 15, any particles entrained in the fluid are removed virtually completely by the finer primary filter 14. Thus, during normal operating temperatures, the secondary filter 15 principally serves as a backup filter in the event the primary filter 14 fails.

During a select temperature range, for example, during startup when the fluid is relatively cold, the temperature-responsive valve 16 is open, allowing at least a portion of the fluid to bypass the primary filter 14. The open valve 16 decreases the differential pressure across the finer primary filter 14. However, the differential pressure remains small across the coarse secondary filter 15 which continues to remove the larger particles that can potentially cause the most damage.

At the lower temperatures, the bimetal washer 53 warps downward toward its inner edge, relieving the upper force against the locking ring 61 and operating against the shoulder 60 to move the annular valve gate 52 downward along the inner wall 44 of the toroidal portion 43 of the annular adapter 40. Bypassing the primary filter 14, the high pressure fluid then flows over the top edge of the inner wall 44, through the annular port 51, and then into the annular space 25 between the primary and secondary filters 14, 15. Thus, fluid flowing between the inlet ports 11 and the exhaust port 12 need only pass through the secondary filter 15.

The predetermined temperature at which the temperature-responsive valve opens may vary depending on the application. For example, the materials of the bimetal washer 53 and the relative location of the groove in the outer wall 45 and the locking ring 61 along the axial dimension of the annular adapter 40 may be selected to cause the valve gate 52 to seal against the seat ring 55 only above a preselected temperature, e.g., 150° F., and to fully open the annular space between the inner wall 44 and the seat ring 55 only below a certain level, e.g., 100° F.

The above-described exemplary filter assembly illustrates the preferred embodiment of the present invention for a particular application. It is particularly suitable for the fabrication of filter assemblies to be used in existing engine lubrication systems constructed without contemplation of a temperature-controlled filtering unit. While a particular embodiment of the invention has been shown, it will be understood, of course, that the invention is not limited to that embodiment since modification may be made by those skilled in the art, particularly in light of the foregoing teachings. It is, therefore, contemplated by the appended claims to cover any such modification as incorporates those features which constitute the essential features of this invention within the true spirit and scope of the invention.

I claim:

1. A filter assembly for removing particles from a fluid, the filter assembly comprising:

first and second filtering means, each having a porous filter medium, the mean pore diameter of the porous filter medium of the second filtering means being greater than the mean pore diameter of the porous filter medium of the first filtering means;

means for directing the fluid serially through the first filtering means and then through the second filtering means;

means for sensing the temperature of the fluid; and valved means arranged in parallel with the first filtering means and serially with the second filtering means, said valved means being responsive to the temperature-sensing means to direct at least a portion of the fluid around the first filtering means in response to a predetermined fluid temperature.

2. The filter assembly of claim 1 wherein the filter medium of at least one of the filtering means is pleated.

3. The filter assembly of claim 1 wherein each of the filtering means has a hollow, generally cylindrical configuration.

4. The filter assembly of claim 1 wherein the temperature-sensing means and the valve are integrally formed.

5. A filter assembly comprising:
a housing having an inlet for admitting a fluid, an outlet for exhausting the fluid, and a fluid flow path therebetween;
upstream and downstream filtering means positioned in the housing in the fluid flow path, the upstream filtering means being spaced from the downstream filtering means and each including a porous filter medium, the mean pore diameter of the porous filter medium of the upstream filtering means being smaller than the mean pore diameter of the porous filter medium of the downstream filtering means; and
temperature-sensing means including temperature responsive valve for directing at least a portion of the fluid around the upstream filtering means and through the downstream filtering means when the temperature of the fluid is less than a predetermined temperature.

6. The filter assembly of claim 5 wherein the upstream and downstream filtering means each have a hollow, generally cylindrical configuration, the inside diameter of the upstream filtering means is larger than the outside diameter of the downstream filtering means, and the downstream filtering means is disposed coaxially within the upstream filtering means, and wherein the temperature-responsive valve communicates between the inlet and the space between the upstream and downstream filtering means.

7. The filter assembly of claim 6 wherein the upstream and downstream filtering means each include a perforated core and wherein each filter medium is pleated, the pleated filter medium being disposed about the perforated core.

8. The filter assembly of claim 6 wherein the temperature-responsive valve includes:
a central cylindrical sleeve;
a seat ring lying in a plane normal to the axis of said central cylindrical sleeve;
an outer cylindrical wall coaxial with said central cylindrical sleeve and of larger diameter than said sleeve so as to form an annular passage between said central cylindrical sleeve and said outer cylindrical wall and with an end lying in a plane normal to the axis of said central cylindrical sleeve and apart from said seat ring so as to provide a circumferential aperture between said end of said outer cylinder wall and said seat ring;
wherein said temperature-responsive valve comprises;
an annular valve gate slidably mounted about said outer cylindrical wall; and
a means for urging said valve gate against said seat ring to close over said circumferential aperture when the temperature of said fluid is above a predetermined temperature.

9. The filter assembly of claim 8 wherein said means for urging said valve gate against the seat ring comprises a bimetallic Belleville spring.

10. The filter assembly of claim 8 wherein said means for urging said valve gate against the seat ring comprises a shape memory metal spring.

11. A filter element comprising:
first and second filtering means, each filtering means having a hollow, generally cylindrical configuration and including a porous filter medium, the inside diameter of the first filtering means being greater than the outside diameter of the second filtering means and the mean pore diameter of the filter medium of the first filtering means being smaller than the mean pore diameter of the filter medium of the second filtering means,
end means for positioning the first and second filtering means, the second filtering means being disposed coaxially within the first filtering means, thereby defining a first space between the first and second filtering means and a second space within the second filtering means, the end means including means defining a first aperture communicating with the first space, means defining a second aperture communicating with the second space, and first and second circular sealing means respectively disposed at one end of the first and second filtering means, and
temperature responsive valve means for allowing fluid to flow through said first aperture only when the temperature of the fluid is below a predetermined temperature.

12. The filter element of claim 11 wherein the mean pore diameter of the filter medium of the second filtering means is greater than the mean pore diameter of the filter medium of the first filtering means.

13. The filter element of claim 11 wherein the first and second filtering means each further include a perforated core and wherein each filter medium is pleated, the pleated filter medium being disposed about the perforated core.

14. A process for filtering a fluid comprising:
sensing the temperature of the fluid;
passing the fluid through a first porous filter medium and then through a second porous filter medium when the temperature of the fluid is greater than a predetermined temperature, the mean pore diameter of the second filter medium being greater than the mean pore diameter of the first filter medium; and
directing at least a portion of the fluid to bypass the first porous filter medium and then through the second porous filter medium when the temperature of the fluid is less than the predetermined temperature.

15. The filtering process of claim 14 further comprising passing the remainder of the fluid through the first porous filter medium when the fluid temperature is less than the predetermined temperature and then passing the remainder of the fluid through the second porous filter medium.

* * * * *